United States Patent [19]
Broyer et al.

[11] Patent Number: 5,202,607
[45] Date of Patent: Apr. 13, 1993

[54] ADAPTER FOR FLUORESCENT LAMPS

[76] Inventors: Gary Broyer, 463 Stanhope Rd., Sparta, N.J. 07871; Gregory Murphy, 287 Alexandria Dr., Hackettstown, N.J. 07840

[21] Appl. No.: 688,673

[22] Filed: Apr. 22, 1991

[51] Int. Cl.⁵ .................... H01J 7/44; H05B 41/36
[52] U.S. Cl. ........................... 315/58; 315/71; 315/291; 315/324; 315/362
[58] Field of Search ............ 315/58, 59, 71, 72, 315/100, 53, 54, DIG. 4, 51, 52, 240, 244, 245, 291, 324, 362

[56] References Cited

U.S. PATENT DOCUMENTS

| | | | |
|---|---|---|---|
| 4,284,925 | 8/1981 | Bessone et al. | 315/53 X |
| 4,523,130 | 6/1985 | Pitel | 315/DIG. 4 X |
| 4,593,231 | 6/1986 | Wisbey et al. | 315/100 |
| 4,766,353 | 8/1988 | Burgess | 315/DIG. 4 X |

Primary Examiner—Eugene R. LaRoche
Assistant Examiner—Ali Neyzari
Attorney, Agent, or Firm—Thomas L. Adams

[57] ABSTRACT

An adapter can independently and selectively power two fluorescent lamps. The adapter has a case with two sockets adapted to connect to the two fluorescent lamps. The adapter also has ballasts mounted in the case for inductively conveying current. A base mounted on the case has first, second and third contacts. The first and the third contacts have serially connected between them one of the ballasts and one of the sockets. The other one of the sockets is serially connected with another one of said ballasts, between the second and third contacts.

14 Claims, 2 Drawing Sheets

ADAPTER FOR FLUORESCENT LAMPS

BACKGROUND OF THE INVENTION

The present invention relates to fluorescent lamp adapters, and in particular, to a device for powering a pair of fluorescent lamps independently and selectively.

Fluorescent lamps are known for their energy efficiency. Fluorescent lamps are often chosen over incandescent lamps to reduce power consumption and heat generation. With this in mind, a large market exists for retrofiting various types of lamp fixtures originally designed to accommodate incandescent lamps.

A difficulty with retrofiting existing incandescent lamp fixtures is the room needed for the complete circuit. A fluorescent lamp circuit usually requires a relatively large ballast and, perhaps, a starter. These bulky components can hamper mounting a fluorescent lamp in an incandescent light fixture. For example, the harp typically fitting around the socket of an incandescent table lamp restricts the space available for fluorescent lamp adapter.

In U.S. Pat. No. 4,683,402, a fluorescent lamp adapter uses a toroidal ballast that fits around a fluorescent lamp socket. This design reduces the overall volume of the adapter and allows screwing of the adapter into a conventional incandescent lamp socket.

In U.S. Pat. No. 4,645,283, a fluorescent lamp adapter has its ballast detachably connected to the side of the adapter case. This side-mounted ballast can be removed to provide clearance so the main case can be screwed into a lamp socket. The threaded base of the adapter base will ratchet to allow turning even after threading is complete. Once the main adapter case is properly positioned, the side ballast can be attached. See also U.S. Pat. Nos. 3,953,761; 4,363,083; and 4,841,193.

The well known three way bulb has dual filaments within a single glass envelope. This bulb typically has a screw base with three contacts for allowing individual and simultaneous powering of the two filaments. The above patents do not consider retrofiting the lamp fixtures designed to receive a conventional three way light bulb. These references do not disclose either multiple fluorescent lamps or adjusting the drive to the lamps.

A retrofit adapter for simulating a three way light bulb faces special difficulties. The ballasts for enabling a three way fluorescent lamp tend to run hot. Also when multiple ballasts are used, they occupy a significant amount of space. As noted above, a bulky adapter can be difficult to mount in an incandescent lamp socket. Furthermore, the ballasts must be positioned to allow efficient heat dissipation, so that the adapter does not become excessively hot.

Accordingly, there is a need for a compact adapter that can simulate a three way incandescent light bulb. The adapter ought to be designed to operate at a safe temperature.

SUMMARY OF THE INVENTION

In accordance with the illustrative embodiments demonstrating, features and advantages of the present invention, there is provided an adapter for independently and selectively powering two fluorescent lamps. The adapter has a case with two sockets adapted to be connected to the two fluorescent lamps. The adapter has a ballast means mounted in the case for inductively conveying current. Also included is a base mounted on the case. The base has first, second and third contacts. The first and third contacts have serially connected between them, the ballast means and one of the sockets. The other one of the sockets is serially connected with the ballast means between the second and third contacts.

By employing such apparatus, one can retrofit lamps sockets designed to receive three way incandescent light bulbs. In a preferred embodiment, a plastic case is generally shaped as a rectangular prism having at its bottom a neck which supports an electrical base. The base can connect to a conventional three-way lamp socket. The case preferably has bottom vents and side vents.

Internally mounted at the bottom of the case are a preferred pair of side by side ballasts. Open space above the ballast will facilitate convection cooling and provide clearance for the mounting of fluorescent lamp sockets. The ballasts can be separated by a thermal insulating barrier. One of the ballasts can be larger to support a fluorescent lamp having a higher rating. Each of the ballasts are preferably connected serially with an associated one of the fluorescent lamp sockets. The fluorescent lamp sockets have a common connection to one of the contacts of the electrical base.

In this preferred embodiment, the base can have a threaded shell that initially stays in the same angular position on the neck when the case is being screwed into a lamp socket. By overtorqueing the case, the preferred shell can ratchet relative to the neck of the case. This allows the adapter case to assume any angular position needed to fit within a light fixture. Thus an adapter can be built wide and the larger dimension can be oriented to avoid interference with other structures, such as a harp.

A BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings wherein.

DETAILED DESCRIPTION OF THE PREFERRED EMBODIMENTS

Figure 1:
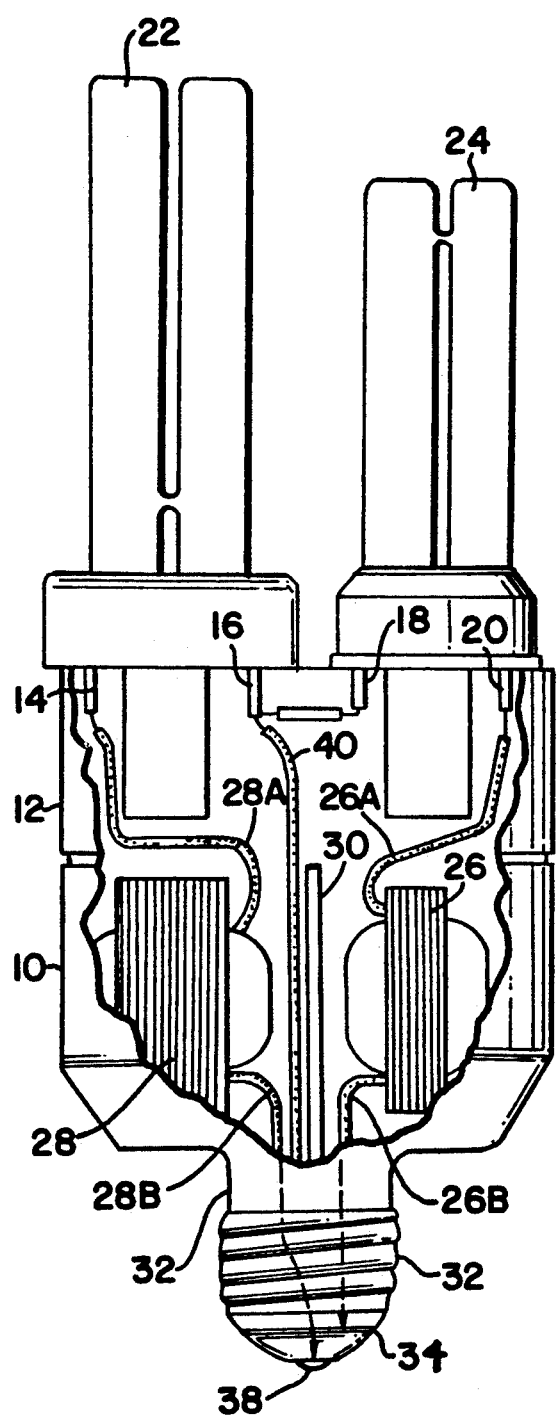
FIG. 1 is a side view of an adapter, with a portion of its case broken away for illustrative purposes, in accordance with the principles of the present invention.
Figure 2:
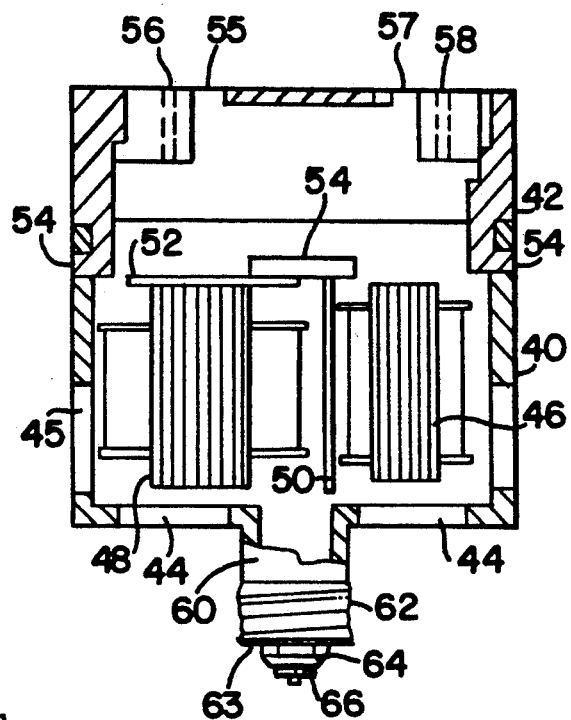
FIG. 2 is a partially sectioned view of an adapter, which is an alternate of that of FIG. 1.

Referring to FIG. 1, an adapter is shown employing a case having a lower casing 10 and an upper cover 12. The case segments 10 and 12 can be snapped together, but other fastening techniques such as riveting, glueing or other appropriate means can be used instead. Case 10 can be formed of a molded thermoplastic and is generally a rectangular prism whose width exceeds its depth. In a preferred embodiment, the case is made of Valox brand thermoplastic (grade 855) made by General Electric. This thermoplastic is chosen for its excellent heat conducting properties.

Fluorescent lamp sockets are shown herein as pin receptacles 14-20 adjacent to upper openings in the case cover 12. The receptacle pair 14, 16 is spaced around one opening to receive a compact fluorescent lamp shown herein as a quad tube 22, rated at 13 watts, for example. Mounted adjacent to quad lamp 22, is another compact fluorescent lamp shown herein as a bi-tube 24. Tube 24 connects to pin receptacles 18 and 20 mounted atop case cover 12. Case cover 12 could be arranged to receive fluorescent lamps of different ratings and styles and could employ different sockets, as required. The illustrated bi-tube 24 can be rated at 5, 7 or 9 watts or at another wattage as desired.

Mounted in the lower recesses of casing 10 is a ballast means shown herein as first ballast 26 and second ballast 28. Each of the ballasts 26 and 28 have a core made of a stack of "E" and "I" laminations. The laminations form a "FIG. 8" core. The center leg of the core is encircled by a bobbin holding multiple turns of wire. The ballasts 26 and 28 are essentially inductors having two pairs of leads 26A, 26B and 28A, 28B, respectively. A rectangular, thermal insulating barrier 30 is mounted between and parallel to ballast inductors 26 and 28. The barrier 30 can be formed of a material which is a good thermal insulator, for example Nomex material or other insulating materials. The ballast inductors 26 and 28 as well as barrier 30 can be fitted into slots or grooves molded inside case bottom 10.

An electrical base is shown herein as cylindrical neck 32 supporting threaded shell 34, which acts as a third contact. The other two contacts are metallic disk 36, acting as a second contact, and metallic button 38, acting as a first contact. The contacts 34, 36 and 38 are spaced to avoid shorting. Contact 38 connects to lead 28B of ballast 28, whose other lead 28A connects to receptacle 14 of lamp 22. Receptacle 16 and 18 commonly connect through lead 41 to shell 34. Contact 36 connects to lead 26B of ballast inductor 26, whose other lead 26A connects to receptacle 20 of lamp 24. Ballasts 26 and 28 have a rating appropriate for the rating of lamps 22 and 24.

Referring to FIGS. 2-6, an alternate case is illustrated with a lower casing 40 and an upper case cover 42. Case cover 42 is shown having fingers 54 that engage matching slots in the sides of lower base 40. Lower casing 40 has a plurality of vents 44 underneath ballast inductors 46 and 48. Ballast inductors 46 and 48 are the same as the previously illustrated ballasts, except that the axis of the bobbin is rotated 90° to a vertical orientation. For simplification, the wiring of ballasts 46 and 48 is omitted, but would be the same as previously illustrated in FIG. 1.

Located between ballasts 46 and 48 is a thermal insulating barrier 50 identical to that previously illustrated (barrier 30 of FIG. 1). Additionally, a thermal insulating partition 52 is mounted atop ballast 48. Partition 52 can be composed of the same material as barrier 50. Ballast 48 has the larger rating. The thermal insulating panels 52 and 50 isolate ballast 48 and direct its heat through vents 44 and 45. This isolation prevents excessive heat from reaching ballast 46 or the sockets in base cover 42.

In this embodiment, the sockets are arranged so that the receptacles 56 and 58 of each socket are spaced laterally. Base cover 42 is relatively hollow and is not, in this embodiment, filled with a potting substance. This open structure promotes convection cooling and prevents excessive heat building up around ballasts 46 and 48 or the sockets 55 and 57.

The underside of lower casing 40 has a cylindrical neck 60 that supports a threaded metallic shell 62. Beyond shell 62 is a disk contact 64. Mounted beyond disk contact 64 is a button contact 66. Contacts 62, 64, 66 provide the three connections necessary for a three way light. Mounted adjacent to and in contact with threaded shell 62, is a conductive annular washer 63.

Figure 8:
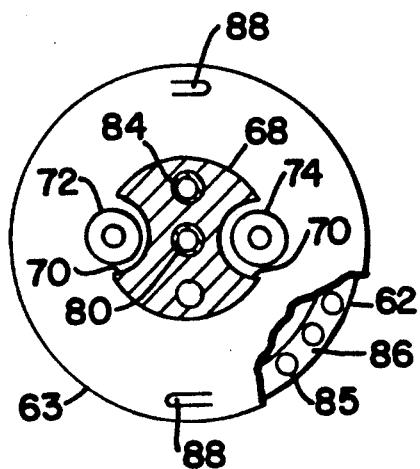
FIG. 8 is a cross sectional view of the base taken along line 8—8 of FIG. 7.
Figure 3:
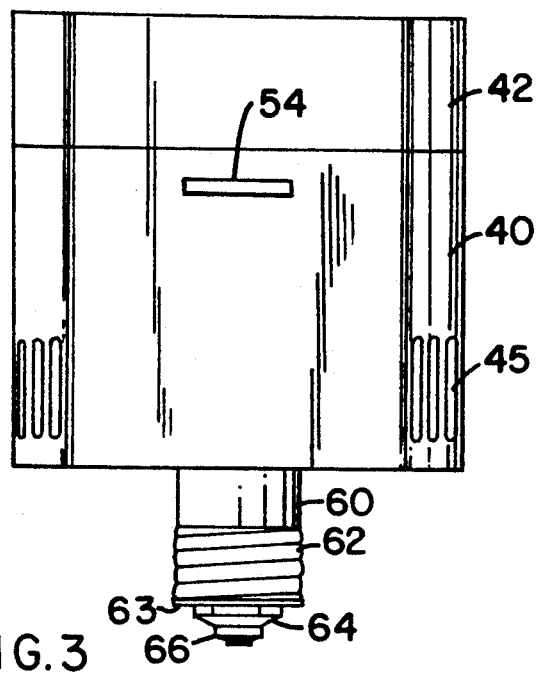
FIG. 3 is a front view of the FIG. 2 adapter.
Figure 4:
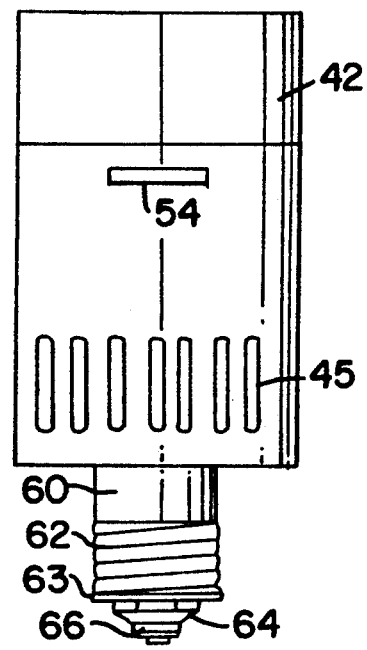
FIG. 4 is a side view of the FIG. 2 adapter.
Figure 5:
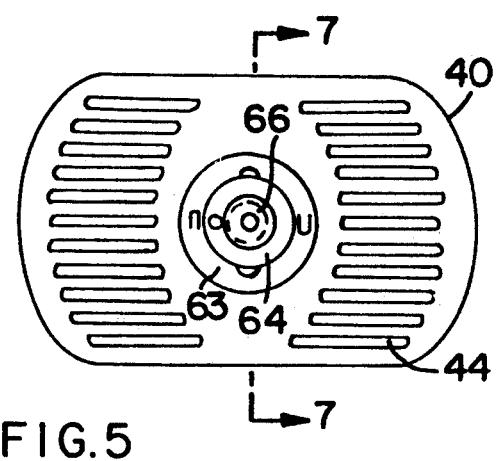
FIG. 5 is a bottom view of the adapter of FIG. 2.
Figure 6:
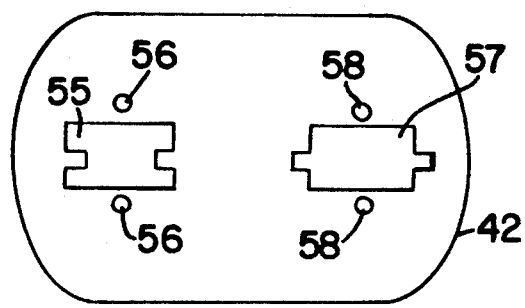
FIG. 6 is a top view of the FIG. 2 adapter.
Figure 7:
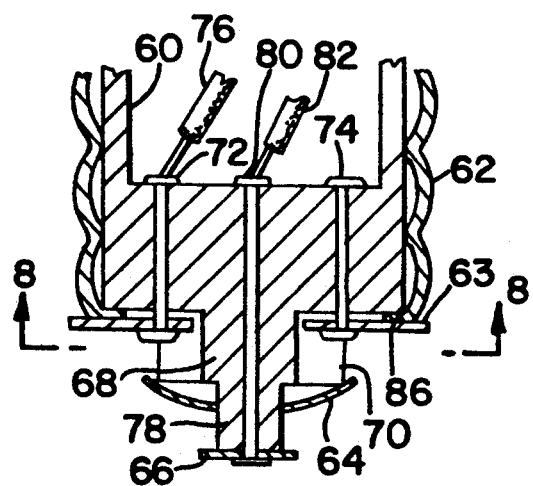
FIG. 7 is an axial sectional view of the base taken along line 7—7 of FIG. 5.

Referring to FIGS. 7 and 8, previously illustrated neck 60 is shown to be hollow for a portion of its length. As before, shell 62 encircles neck 60. Neck 60 has projecting outwardly from it, a pedestal 68. Pedestal 68 has relieved sections 70 sized to accommodate a pair of eyelets 72 and 74 that are secured between the conductive washer 63 and the interior transverse face of neck 60. The outer end of eyelet 72 is soldered to washer 63 and its inner end is soldered to lead 76. Projecting from pedestal 68 is a cylindrical boss 78. A coaxial bore holds eyelet 80, which effectively rivets metallic button 66 into place. The outer end of eyelet 80 is soldered to button 66 and the inner end is soldered to lead 82. A fourth eyelet 84 (FIG. 8) is spaced 90° from eyelet 72 and 74 and connects a metallic disk 64 to neck 60 where another lead (not shown) is soldered thereto.

Figure 9:
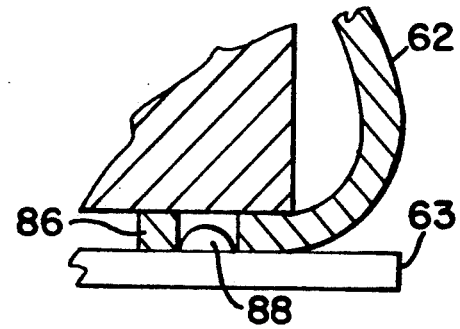
FIG. 9 is detailed view of the joint between the shell and conductive washer of FIG. 7.

The outer end of shell 62 is shown turned over and inward to form a flange 86, which is in electrical contact with washer 63 (see also FIG. 9). Flange 86 has a plurality of peripheral holes 85. Washer 63 has a pair of pawl means 88, illustrated as spring tabs punched out of the material of washer 63.

Shell 62 is fitted snugly around neck 60 and does not normally turn, but excessive torque applied when threading shell 62 into a socket (not shown) can cause it to slip with respect to neck 60. When unthreading shell 62, it does not slip because spring tabs 88 engage the holes 85 in the flange 86 of shell 62. Thus the shell can always be reliably removed from a socket.

In operation, a lamp fixture can be fitted with the illustrated adapter by first removing any interfering structure such as a harp that may be attached adjacent to an incandescent lamp socket (not shown). Thereafter, case 10, 12 can be threaded into the socket by using the base, that is, threaded shell 34. When shell 34 is fully threaded into the socket, the case can be rotated further by using additional force, allowing the spring tabs 88 to ratchet over holes 85 in shell 62. This orientation permits the greater width of the case 40, 42 to fit transversely between a harp. Thereafter, the compact fluorescent lamps 22, 24 can be plugged into sockets 55 and 57. Thereafter, power can be switched into disk 64 and/or metallic button 66 to power one or both of the lamps in socket 55 and 57. The conductive shell 62 acts as a return for the common terminals of the fluorescent lamps. Ballast 46 and 48 within casing 40 generate heat, which is dissipated through the vents 44 and 45. The greater amount of heat generated by ballast 48 is isolated by the thermal insulating barriers 52 and 50. This prevents excessive heat from reaching the sockets or the base.

It is to be appreciated that various modifications may be implemented with respect to the above described preferred embodiments. While a threaded medium lamp base is illustrated, other size bases can be used instead. Furthermore, non-screw type bases can be used such as bayonet type, plug type and other types of connections. Furthermore, the size, rating and configuration of the compact fluorescent lamps can be altered depending upon the available space and the desired light output. Also, the position of the fluorescent lamp sockets can be altered depending upon the available space and the desired lighting direction. Similarly, the size and shape of the adapter case can altered depending upon the available space and the rating and heat generation of the ballast. Also, more or fewer thermal insulators can be used to isolate the various heat generating sources depending upon their size and rating. Also, the ballasts can be wound on various cores and in appropriate situations a common ballast can be used.

Obviously many modifications and variations of the present invention are possible in light of the above teachings. It is therefore to be understood that within the scope of the appended claims, the invention may be practiced otherwise than as specifically described.

We claim:

1. An adapter for independently and selectively powering two fluorescent lamps, each of said lamps being selectively powerable either alone or together, comprising:
   a case having two sockets adapted to connect to said two fluorescent lamps;
   ballast means mounted in said case for inductively conveying current; and
   a base mounted on said case and having first, second and third contacts, said ballast means having first and second ballast inductors, said first and said third contacts having serially connected between them said first ballast inductor and one of said sockets, the other one of said sockets being serially connected with said second ballast inductor between said second and said third contacts.

2. An adapter according to claim 1 wherein said case is vented and said sockets are opposite said base.

3. An adapter according to claim 2 wherein said case comprises:
   a thermal insulating barrier between said first and said second ballast inductor.

4. An adapter according to claim 3 wherein said case is vented below and alongside said ballast means.

5. An adapter according to claim 1 wherein said two sockets are adapted to connect to fluorescent lamps having different ratings, said second ballast inductor being connected to that one of said sockets having a greater rating, said adapter further comprising:
   a thermal insulating partition mounted in said case between said second ballast inductor and said sockets.

6. An adapter for independently and selectively powering two fluorescent lamps having different ratings, comprising:
   a vented case having two sockets adapted to connect to said two fluorescent lamps, said case including an inner neck having a coaxial middle pedestal and a coaxial outer boss, said middle pedestal being between said boss and said neck;
   first and second ballast inductors mounted in said case for inductively conveying current, said case being vented below and alongside said ballast conductors;
   a thermal insulating barrier between said first and said second ballast inductor;
   a thermal insulating partition mounted in said case between said second ballast inductor and said sockets; and
   a base mounted on said case opposite said sockets and having first, second and third contacts, said first and said third contacts having serially connected between them said first ballast inductor and one of said sockets, the other one of said sockets being serially connected with said second ballast inductor between said second and said third contacts, said second ballast inductor being connected to that one of said sockets having a greater rating, said base comprising:
   (a) a threaded conductive shell rotatably mounted around said inner neck, said shell having an inwardly directed flange with a plurality of circumferentially distributed holes;
   (b) an annular conductive disk mounted on said pedestal;
   (c) a conductive button mounted on said outer boss, said disk, said button and said shell forming said first, said second and said third contacts, respectively;
   (d) a conductive washer mounted around said middle pedestal and touching said threaded shell, said washer having a spring tab for engaging said shell and limiting its rotation to one direction, by ratcheting in said holes in said flange; and
   (e) a first, second and third eyelet affixed through said case for securing and electrically connecting said disk, said button and said shell, respectively.

7. An adapter for independently and selectively powering two fluorescent lamps, comprising:
   a case having two sockets adapted to connect to said two fluorescent lamps, said case including an inner neck having a coaxial middle pedestal and a coaxial outer boss, said middle pedestal being between said boss and said neck;
   ballast means mounted in said case for inductively conveying current; and
   a base mounted on said case and having first, second and third contacts, said first and said third contacts having serially connected between them said ballast means and one of said sockets, the other one of said sockets being serially connected with said ballast means between said second and said third contacts, said base including:
   (a) an annular conductive disk mounted on said pedestal and forming said first contact;
   (b) a conductive button mounted on said outer boss and forming said second contact;
   (c) a threaded conductive shell rotatably mounted around said inner neck and forming said third contact; and
   (d) a conductive washer mounted around said middle pedestal and touching said threaded shell, said washer having a pawl means for engaging said shell and limiting its rotation to one direction.

8. An adapter according to claim 7 wherein said ballast means comprises:
   first and second ballast inductors, said first and said third contacts having serially connected between them said first ballast inductor and one of said sockets, the other one of said sockets being serially connected with said second ballast inductor between said second and said third contacts.

9. An adapter according to claim 8 wherein said case is vented and said sockets are opposite said base.

10. An adapter according to claim 9 wherein said case comprises:

a thermal insulating barrier between said first and said second ballast inductor.

11. An adapter according to claim 10 wherein said case is vented below and alongside said ballast means.

12. An adapter according to claim 8 wherein said two sockets are adapted to connect to fluorescent lamps having different ratings, said second ballast inductor being connected to that one of said sockets having a greater rating, said adapter further comprising:

a thermal insulating partition mounted in said case between said second ballast inductor and said sockets.

13. An adapter according to claim 12 wherein said shell has an inwardly directed flange with a plurality of circumferentially distributed holes, said pawl means comprising:

a spring tab on said washer for ratcheting in said holes in said flange.

14. An adapter according to claim 13 comprising:

a first, second and third eyelet affixed through said case for securing and electrically connecting said disk, said button and said shell, respectively.

* * * * *